US012334634B2

(12) United States Patent
Kim et al.

(10) Patent No.: US 12,334,634 B2
(45) Date of Patent: Jun. 17, 2025

(54) SHORT-RANGE COMMUNICATION ANTENNA FOR MULTI-LINK COMMUNICATION

(71) Applicant: SENSORVIEW CO., LTD., Seongnam-si (KR)

(72) Inventors: Byoung Nam Kim, Suwon-si (KR); Chul-Keun Park, Seongnam-si (KR); Hong Il Yoo, Gwangmyeong-si (KR)

(73) Assignee: SENSORVIEW CO., LTD., Seongnam-si (KR)

( * ) Notice: Subject to any disclaimer, the term of this patent is extended or adjusted under 35 U.S.C. 154(b) by 183 days.

(21) Appl. No.: 18/468,955

(22) Filed: Sep. 18, 2023

(65) Prior Publication Data

US 2024/0006757 A1 Jan. 4, 2024

Related U.S. Application Data

(63) Continuation of application No. PCT/KR2022/001619, filed on Jan. 28, 2022.

(30) Foreign Application Priority Data

Mar. 19, 2021 (KR) ........................ 10-2021-0035751

(51) Int. Cl.

| | |
|---|---|
| ***H01Q 1/52*** | (2006.01) |
| ***H01Q 9/04*** | (2006.01) |
| ***H01Q 19/00*** | (2006.01) |

(52) U.S. Cl.

CPC ........... *H01Q 1/525* (2013.01); *H01Q 9/0407* (2013.01); *H01Q 19/005* (2013.01)

(58) Field of Classification Search

CPC .......... H01Q 1/243; H01Q 1/38; H01Q 1/523; H01Q 1/525; H01Q 5/378; H01Q 9/0407; H01Q 19/005; H01Q 21/065

See application file for complete search history.

(56) References Cited

U.S. PATENT DOCUMENTS 5,777,581 A 7/1998 Lilly et al.
6,061,025 A 5/2000 Jackson et al.
(Continued)

FOREIGN PATENT DOCUMENTS

KR 10-2015-0122746 A 11/2015
KR 10-1660921 B1 9/2016
(Continued)

OTHER PUBLICATIONS

International Search Report issued from PCT International Application No. PCT/KR2022/001619 issued on Jan. 28, 2022.
(Continued)

*Primary Examiner* — Daniel Munoz

(57) ABSTRACT

A short-range communication antenna for multi-link communication includes a plurality of radiators each independently set to transmit and receive different signals and having a predetermined array structure, in which each of the plurality of radiators includes: a patch-shaped radiating element; a first parasitic element formed to surround the radiating element; and a second parasitic element formed to surround the first parasitic element, wherein each of the plurality of radiators is rotated +90 degrees or −90 degrees compared to adjacent radiators.

14 Claims, 5 Drawing Sheets

(56) References Cited

U.S. PATENT DOCUMENTS

| | | | | |
|---|---|---|---|---|
| 2016/0365632 | A1* | 12/2016 | Lee | H01Q 3/446 |
| 2020/0059011 | A1 | 2/2020 | Sarabandi et al. | |
| 2023/0299819 | A1* | 9/2023 | Zhu | H01Q 21/20<br>375/267 |

FOREIGN PATENT DOCUMENTS

| | | | |
|---|---|---|---|
| KR | 10-1745961 | B1 | 6/2017 |
| KR | 10-2018-0034429 | A | 4/2018 |
| WO | 2017-202335 | A1 | 11/2017 |

OTHER PUBLICATIONS

Written Opinion of International Search Authority issued from the WIPO dated Jan. 28, 2022 for the PCT International Application No. PCT/KR2022/001619.

* cited by examiner

SHORT-RANGE COMMUNICATION ANTENNA FOR MULTI-LINK COMMUNICATION

CROSS-REFERENCE TO RELATED APPLICATIONS

This application is a bypass continuation of pending PCT International Application No. PCT/KR2022/001619, which was filed on Jan. 28, 2022, and which claims priority from Korean Patent Application No. 10-2021-0035751 filed on Mar. 19, 2021. The entire contents of the aforementioned patent applications are incorporated herein by reference.

BACKGROUND

1. Technical Field

The present disclosure relates to a short-range communication antenna, and more particularly, to a short-range communication antenna for multi-link communication.

2. Description of the Related Art

With the development of communication technology, the proportion of machine-to-machine communication such as IoT (Internet of Things) is increasing, and antennas are installed in various devices besides mobile phones to perform various types of wireless communication.

In particular, in recent years, device-to-device communication in which short-range communication is performed between a plurality of devices is rapidly increasing. Unlike IoT, this communication between a plurality of devices is not controlled by a base station like LTE and 5G, and the communication is performed independently in a local network.

Since such short-range communication between multiple devices uses multiple antennas to form multi-links with multiple devices while simultaneously performing communication, interference between radiators acts more severely than IoT in which transmission and reception times are distinguished. When a specific radiator transmits, other radiators may receive signals, so interference between radiators causes a greater degradation of communication performance compared to general IoT communication.

In order to mitigate interference between radiators, various methods such as slit and barrier ribs have been tried for conventional array antennas using multiple radiators, but communication antennas between multiple devices have a problem in that the antenna cannot sufficiently mitigate interference with only this structure.

SUMMARY OF THE INVENTION

An object of the present disclosure is to propose a short-range communication antenna capable of effectively mitigating interference between radiators in a short-range communication antenna having a plurality of radiators for multi-link communication.

In order to achieve the above object, according to one aspect of the present disclosure, a short-range communication antenna for multi-link communication is provided, which includes a plurality of radiators each independently set to transmit and receive different signals and having a predetermined array structure, in which each of the plurality of radiators includes: a patch-shaped radiating element; a first parasitic element formed to surround the radiating element; and a second parasitic element formed to surround the first parasitic element, wherein each of the plurality of radiators is rotated +90 degrees or −90 degrees compared to adjacent radiators.

The first parasitic element and the second parasitic element have an oval shape.

The patch-shaped radiating element has a feeding point formed at a point other than the center of the radiating element.

Each of the plurality of radiators further includes a plurality of first decoupling elements spaced apart from the second parasitic element, disposed in an external area of the second parasitic element, and arranged in a first direction toward an adjacent radiator.

Each of the plurality of radiators further includes a plurality of second decoupling elements spaced apart from the second parasitic element, disposed in an external area of the second parasitic element, and arranged in a second direction toward another adjacent radiator.

Each of the plurality of first decoupling elements and the plurality of second decoupling elements is arranged at an interval of λ/2.

The radiating element and the first parasitic element are formed on a first substrate, the second parasitic element, the first decoupling elements and the second decoupling elements are formed on a second substrate located on top of the first substrate, and a ground plane is formed on the lower part of the first substrate.

According to another aspect of the present disclosure, a short-range communication antenna for multi-link communication is provided, which includes a plurality of radiators each independently set to transmit and receive different signals and having a predetermined array structure, in which each of the plurality of radiators includes: a patch-shaped radiating element; a first parasitic element formed to surround the radiating element; a second parasitic element formed to surround the first parasitic element; and a plurality of first decoupling elements spaced apart from the second parasitic element, disposed in an external area of the second parasitic element, and arranged in a first direction toward an adjacent radiator.

According to the present disclosure, there is an advantage in that interference between radiators can be effectively alleviated in a short-range communication antenna having a plurality of radiators for multi-link communication.

DETAILED DESCRIPTION OF THE INVENTION

Figure 1:
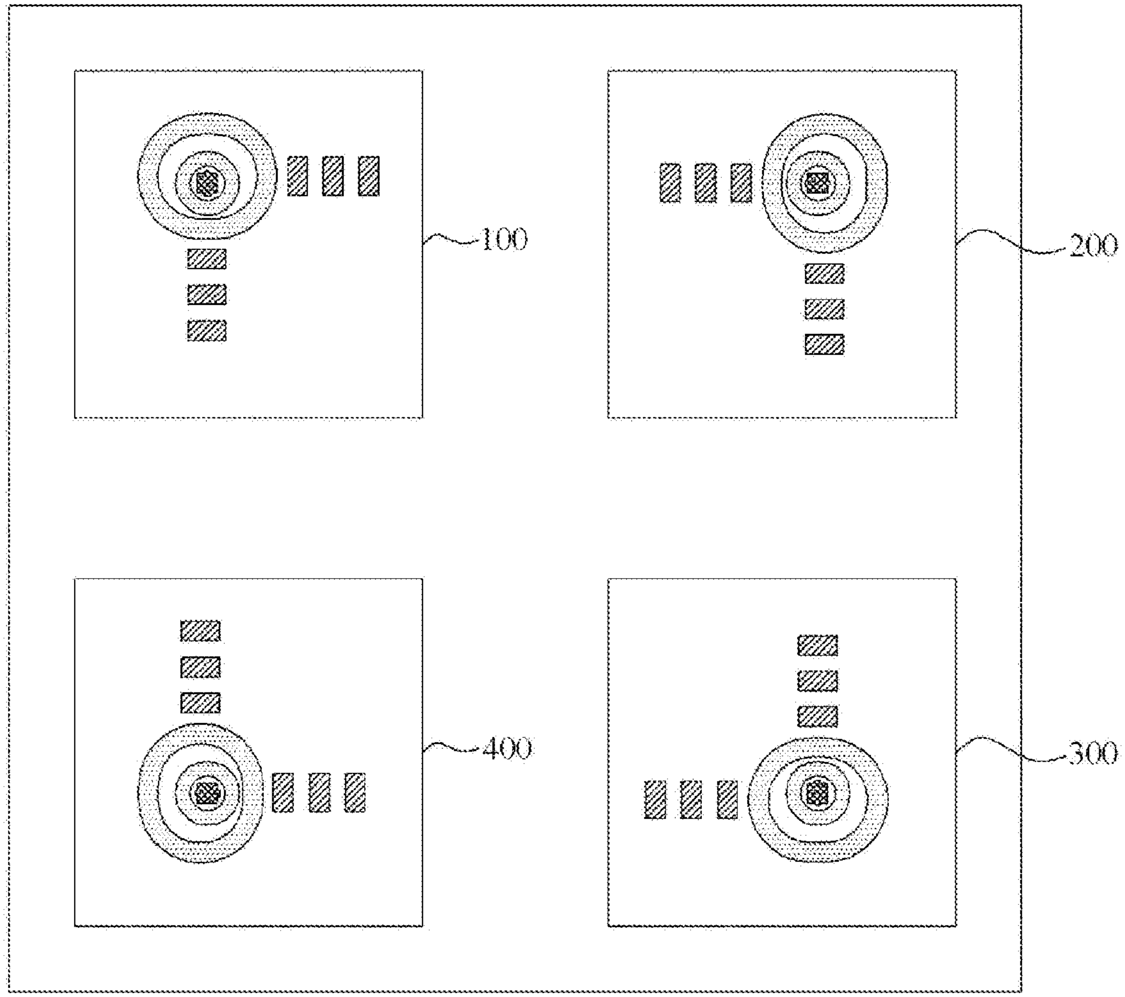
FIG. 1 shows a structure of a short-range communication antenna for multi-link communication according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

FIG. 1 shows a structure of a short-range communication antenna for multi-link communication according to an embodiment of the present disclosure.

The antenna of the present disclosure is a short-range antenna for multi-link communication, and here, the multi-link communication refers to communication that exchanges data by forming a multi-link with multiple devices. For example, communication between multiple devices may include communication in a multi-vision device comprised of multiple TV terminals.

Multi-vision may consist of multiple TV terminals, and the antenna for multi-link communication of the present disclosure may be used for each communication between TV terminals. Of course, communication between multiple devices can be accomplished in a variety of ways, not only in the case of multi-vision.

In communication between multiple devices, one device communicates with multiple devices simultaneously. To this end, an antenna for multi-link communication includes a plurality of radiators for communication with multiple devices, and each radiator transmits and receives signals independently. Since a plurality of radiators transmit and receive signals independently, signals transmitted from a specific radiator act as interference signals of other radiators. In the case of general LTE mobile communication, communication is performed in the half-duplex method, so the transmission time and reception time are distinct, and therefore even if an array antenna is used, the impact of interference between radiators is not significant.

However, since each radiator of a short-range communication antenna for multi-link communication transmits and receives signals independently, the transmission time and reception time are not distinguished, and the transmission signal of a specific radiator may act as a reception signal to other radiators, so the degree of isolation between radiators is more important.

Referring to FIG. 1, the short-range communication antenna for multi-link communication of the present disclosure includes a plurality of radiators 100, 200, 300 and 400. FIG. 1 shows four radiators 100, 200, 300 and 400 arranged in a 2×2 shape. However, it will be apparent to those skilled in the art that the structure shown in FIG. 1 is an exemplary structure and that the number of radiators and the arrangement structure of the radiators may vary. The number of radiators may be determined in proportion to the number of multiple devices being communicated with.

Meanwhile, in a short-range communication antenna, the radiator may be set to perform only one function of transmission or reception. For example, the first radiator 100 may be a radiator for transmission to a first device, and the second radiator 200 may be a radiator for reception from the first device. Furthermore, the third radiator 300 may be a radiator for transmission to a second device, and the fourth radiator 400 may be a radiator for reception from the second device. In this way, when each radiator selectively performs only one of the transmitting function and the receiving function, the short-range communication antenna having four radiators as shown in FIG. 1 will be able to communicate with two other devices.

If communication with four other devices is desired, a total of eight radiators could be used. Of course, each radiator of the present disclosure is not limited to performing only one function of transmission or reception, and each radiator may perform both transmission and reception simultaneously.

Meanwhile, although FIG. 1 shows that elements constituting each radiator are formed on a single substrate, the elements constituting each radiator may also be formed on a multi-layer substrate.

Figure 2:
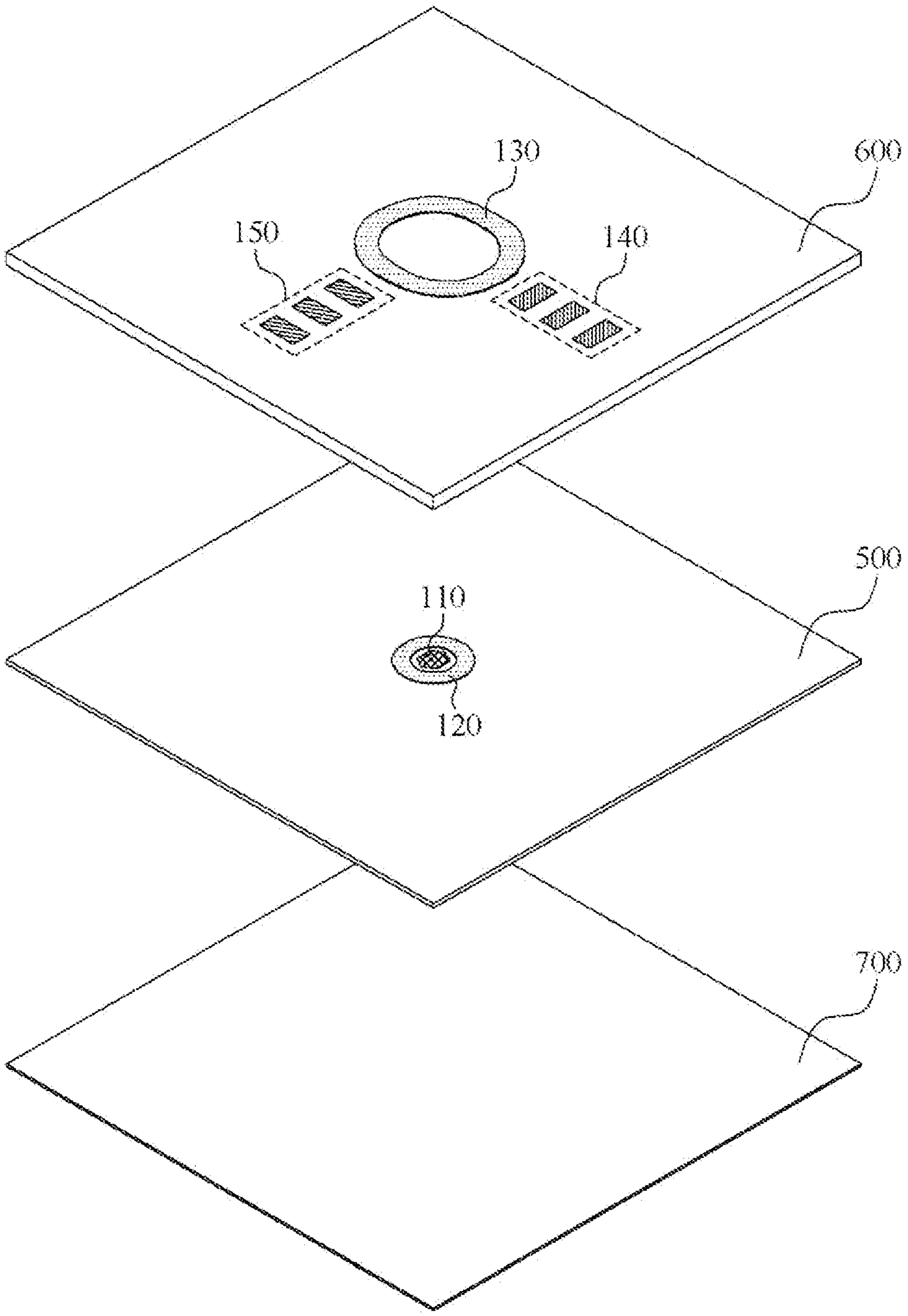
FIG. 2 is an exploded perspective view showing a structure of a single radiator in a short-range communication antenna for multi-link communication according to an embodiment of the present disclosure.

FIG. 2 is an exploded perspective view showing a structure of a single radiator in a short-range communication antenna for multi-link communication according to an embodiment of the present disclosure.

Referring to FIG. 2, each radiator of the short-range communication antenna according to an embodiment of the present disclosure may include a radiating element 110, a first parasitic element 120, a second parasitic element 130, a plurality of first decoupling elements 140 and a plurality of second decoupling elements 150.

Before describing the elements constituting the radiator, FIG. 2 shows two substrates, a first substrate 500 and a second substrate 600. As described above, the elements constituting the radiator may be formed on a single substrate or a multi-layer substrate, and FIG. 2 shows a case where the elements constituting the radiator are formed on two substrates.

The radiating element 110 functions to receive a feed signal and radiate the feed signal or receive a signal transmitted from the outside. The radiating element 110 has a patch shape and receives a feed signal through a feeding point.

A first parasitic element 120 is formed that is spaced apart from the radiating element 110 and surrounds the radiating element 110. In the embodiment shown in FIG. 2, the radiating element 110 and the first parasitic element 120 are formed on the first substrate 500.

According to a preferred embodiment of the present disclosure, the first parasitic element 120 has an oval shape. The first parasitic element 120 is not coupled to ground or a feeding point and exists in an electrically floating state. Parasitic resonance is generated in the first parasitic element 120 by the signal radiated from the radiating element 110, and the radiation band can be expanded due to the additional resonance generated in the first parasitic element 120, and through this, the band of the radiating element 110 can be widened.

The second parasitic element 130 is formed to be spaced apart from the first parasitic element 120 and surround the first parasitic element 120. The second parasitic element 130 is also not coupled to the ground or feeding point and exists in an electrically floating state. In addition, it is preferable that the second parasitic element 130 also has an oval shape.

The second parasitic element 130 functions to change the beam pattern of the signal radiated by the radiating element 110 and the first parasitic element 120, and preferably operates to improve the directivity of the beam by narrowing the beam width of the signal radiated from the radiating element 110. Parasitic resonance may also occur through the second parasitic element 130, and the beam pattern can be changed through parasitic resonance in the second parasitic element 130 having a larger diameter than the first parasitic element 120.

A plurality of first decoupling elements 140 are formed outside the second parasitic element 130 and spaced apart from the second parasitic element 130 and arranged in a first direction. FIG. 2 shows a case where the plurality of first decoupling elements 140 have a rectangular patch shape, but the shape of the first decoupling elements 140 is not limited thereto. FIG. 2 shows a case where three decoupling elements are arranged in a first direction, but the number of the first decoupling elements 140 is not limited thereto.

In addition, a plurality of second decoupling elements 150 are formed outside the second parasitic element 130 and spaced apart from the second parasitic element 130 and arranged in a second direction perpendicular to the first direction. FIG. 2 shows a case where three second decoupling elements 150 have a rectangular patch shape, but the shape and number of the second decoupling elements 150 are also not limited thereto.

The direction in which the first and second decoupling elements 140 and 150 are arranged corresponds to the direction in which adjacent radiators are located.

Referring to FIG. 1, the first radiator 100 is horizontally adjacent to the second radiator 200 and vertically adjacent to the fourth radiator 400. In this case, the first radiator 100 includes first decoupling elements arranged in a first direction (from the first radiator to the second radiator), and second decoupling elements arranged in a second direction (from the first radiator to the fourth radiator direction).

Likewise, the third radiator 300 is adjacent to the fourth radiator 400 in the horizontal direction and is adjacent to the second radiator 200 in the vertical direction. The third radiator includes first decoupling elements arranged in a first direction (from the third radiator to the fourth radiator), and second decoupling elements arranged in a second direction (from the third radiator to the second radiator).

According to a preferred embodiment of the present disclosure, the first and second decoupling elements are arranged at λ/2 intervals. When the plurality of decoupling elements are arranged at λ/2 intervals, isolation from surrounding antennas can be improved in a millimeter wave band.

Due to the decoupling elements, the current induced in each radiator flows through the decoupling elements rather than flowing directly into the other radiator, thereby improving the isolation between antennas.

Referring again to FIG. 2, a ground plane 700 is formed at the bottom of the first substrate 500 and provides a ground potential for appropriate radiation of each radiator.

Figure 3:
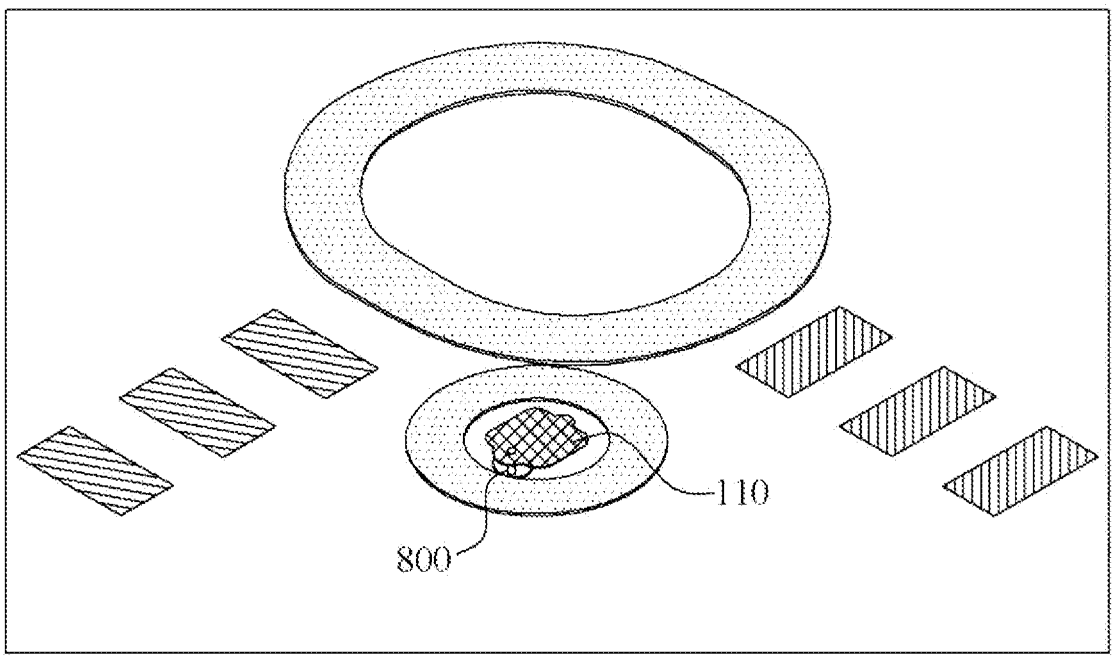
FIG. 3 is a diagram showing a feeding structure of a single radiator according to an embodiment of the present disclosure.

FIG. 3 is a diagram showing a feeding structure of a single radiator according to an embodiment of the present disclosure.

Referring to FIG. 3, in the single radiator according to an embodiment of the present disclosure, a via pin 800 inserted into a via hole penetrating the lower part of the substrate may be coupled to a feeding point of the radiating element 110 to provide a feed signal. The via pin 800 may be electrically connected to a separate feed line to provide the feed signal to the radiating element 110.

According to a preferred embodiment of the present disclosure, it is preferable that the feeding point of the radiating element 110 is set at a location other than the center of the radiating element. As shown in FIG. 3, when the shape of the radiating element 110 is rectangular, the feeding point may be formed at a point close to the edge of the rectangle. The reason why the feeding point is formed at a point other than the center of the radiating element 110 is to double the isolation effect due to the rotation of the radiating elements 100, 200, 300 and 400, which will be explained later.

Figure 4:
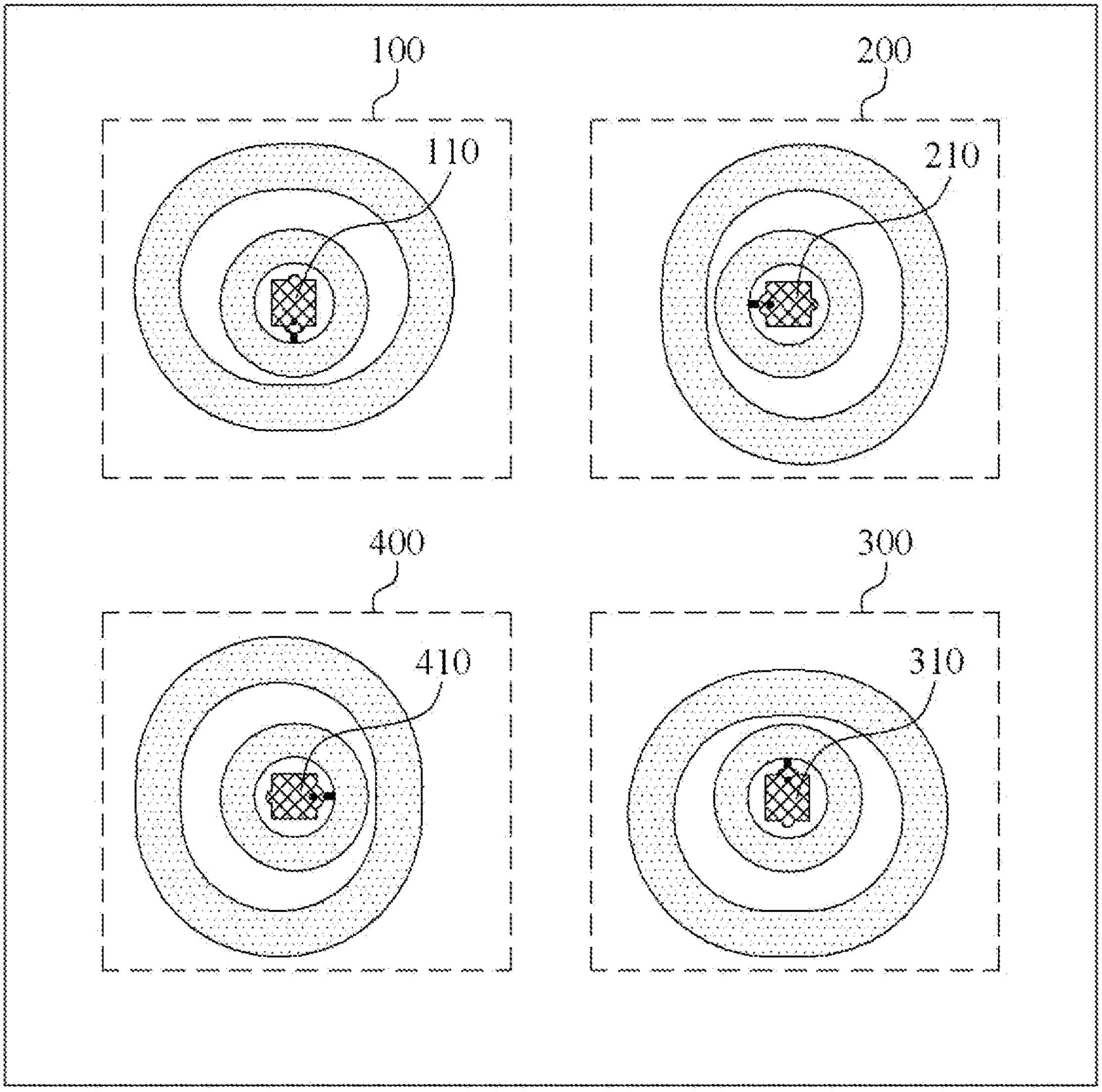
FIG. 4 is a diagram showing a rotation structure of a radiating element of each single radiator according to an embodiment of the present disclosure.

FIG. 4 is a diagram showing a rotation structure of a radiating element of each single radiator according to an embodiment of the present disclosure.

Referring to FIG. 4, the rotation structure of the radiators 100, 200, 300 and 400 excluding the decoupling elements is shown.

Referring to FIG. 4, the second radiator 200 horizontally adjacent to the first radiator 100 is disposed rotated by +90 degrees compared to the first radiator 100. Since the radiating element 210 of the second radiator 200 is rotated +90 degrees compared to the radiating element 110 of the first radiator 100, the position of the feeding point is also rotated. Meanwhile, it can be seen that the first parasitic element and the second parasitic element of the second radiator 200 are also disposed rotated by +90 degrees compared to the first parasitic element 120 and the second parasitic element 130 of the first radiator 100.

The third radiator 400 vertically adjacent to the first radiator 100 is disposed rotated by −90 degrees compared to the first radiator 100. Due to the rotation of the radiating element 310 of the third radiator 300, the position of the feeding point is also changed, and the first parasitic element and the second parasitic element of the third radiator 300 are also disposed rotated compared to the first radiator 100.

That is, the radiators 100, 200, 300 and 400 of the present disclosure are arranged rotated by +90 degrees or −90 degrees compared to adjacent radiators. Due to this rotational arrangement of the radiators, it is possible to minimize signal interference between the radiators.

Meanwhile, referring to FIG. 1, not only the radiating element 110, the first parasitic element 120 and the second parasitic element 130, but also the first decoupling elements 140 and the second decoupling elements 150 are rotated by +90 degrees or −90 degrees compared to the adjacent radiators.

Of course, the decoupling elements may not rotate depending on the arrangement of adjacent radiators. For example, when other radiators are disposed adjacent to all of the top, bottom, left and right sides of a specific radiator, the decoupling elements may be arranged in all directions: top, bottom, left and right.

Figure 5:
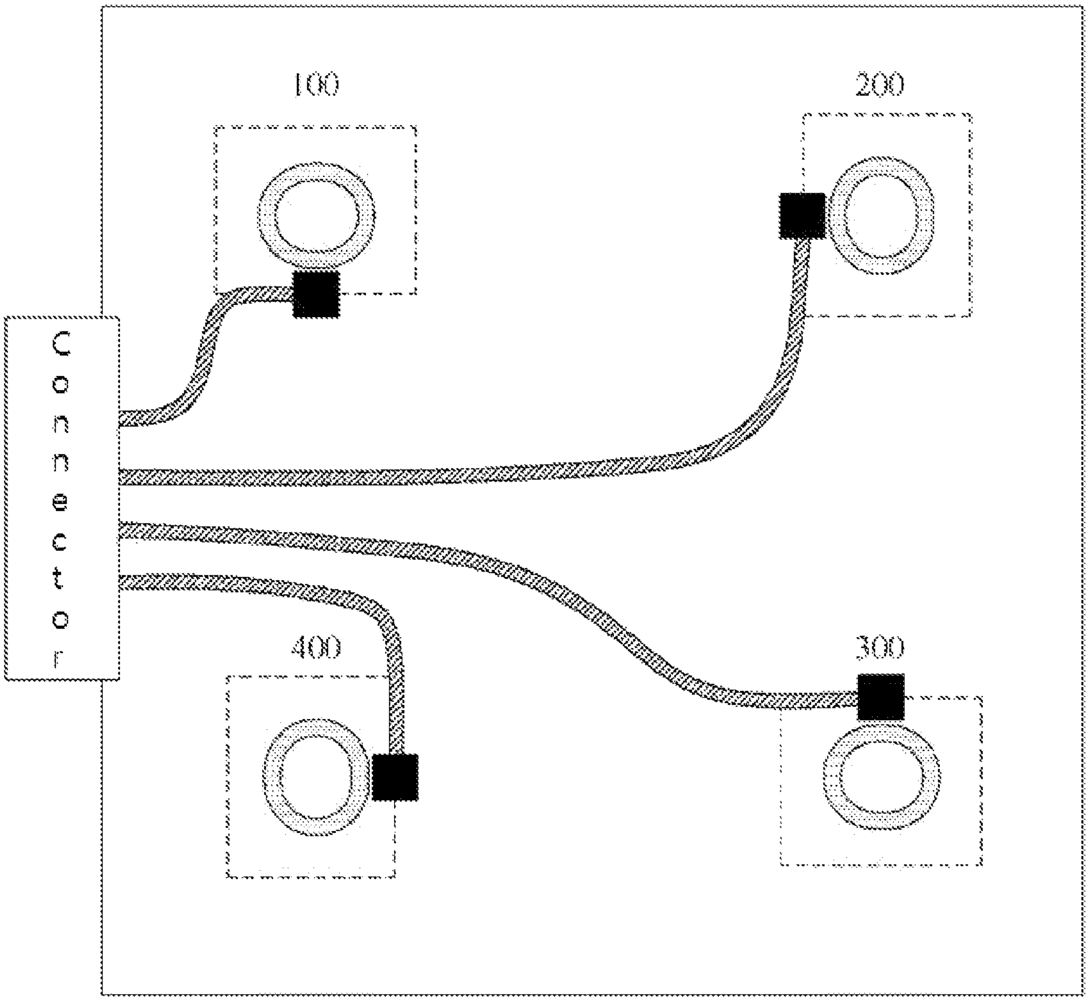
FIG. 5 is a diagram showing the arrangement of feed lines for feeding power to each radiator in a short-range antenna according to an embodiment of the present disclosure.

FIG. 5 is a diagram showing the arrangement of feed lines for feeding power to each radiator in a short-range antenna according to an embodiment of the present disclosure.

Referring to FIG. 5, the feed lines are coupled in different directions due to the rotation of each radiator.

In the embodiment shown in FIG. 5, it can be seen that the first radiator 100 is connected to a feed line in the lower direction, the second radiator 200 is connected to a feed line in the left direction, the third radiator 300 is connected to a feed line in the upper direction, and the fourth radiator 400 is connected to a feed line in the right direction.

Each feed line shown in FIG. 5 is coupled with the via pin shown in FIG. 3 to provide a feed signal to each radiating element 110.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A short-range communication antenna for multi-link communication, including a plurality of radiators each independently set to transmit and receive different signals and having a predetermined array structure,
- in which each of the plurality of radiators includes:
- a patch-shaped radiating element;
- a first parasitic element formed to surround the radiating element; and
- a second parasitic element formed to surround the first parasitic element,
- wherein each of the plurality of radiators is rotated +90 degrees or −90 degrees compared to adjacent radiators.

2. The short-range communication antenna for multi-link communication according to claim 1,
- wherein the first parasitic element and the second parasitic element have an oval shape.

3. The short-range communication antenna for multi-link communication according to claim 2,
- wherein the patch-shaped radiating element has a feeding point formed at a point other than the center of the radiating element.

4. The short-range communication antenna for multi-link communication according to claim 3,
- wherein each of the plurality of radiators further includes a plurality of first decoupling elements spaced apart from the second parasitic element, disposed in an external area of the second parasitic element, and arranged in a first direction toward an adjacent radiator.

5. The short-range communication antenna for multi-link communication according to claim 4,
- wherein each of the plurality of radiators further includes a plurality of second decoupling elements spaced apart from the second parasitic element, disposed in an external area of the second parasitic element, and arranged in a second direction toward another adjacent radiator.

6. The short-range communication antenna for multi-link communication according to claim 5,
- wherein each of the plurality of first decoupling elements and the plurality of second decoupling elements is arranged at an interval of $\lambda/2$.

7. The short-range communication antenna for multi-link communication according to claim 6,
- wherein the radiating element and the first parasitic element are formed on a first substrate, the second parasitic element, the first decoupling elements and the second decoupling elements are formed on a second substrate located on top of the first substrate, and a ground plane is formed on the lower part of the first substrate.

8. A short-range communication antenna for multi-link communication, including a plurality of radiators each independently set to transmit and receive different signals and having a predetermined array structure,
- in which each of the plurality of radiators includes:
- a patch-shaped radiating element;
- a first parasitic element formed to surround the radiating element;
- a second parasitic element formed to surround the first parasitic element; and
- a plurality of first decoupling elements spaced apart from the second parasitic element, disposed in an external area of the second parasitic element, and arranged in a first direction toward an adjacent radiator.

9. The short-range communication antenna for multi-link communication according to claim 8,
- wherein each of the plurality of radiators further includes a plurality of second decoupling elements spaced apart from the second parasitic element, disposed in an external area of the second parasitic element, and arranged in a second direction toward another adjacent radiator.

10. The short-range communication antenna for multi-link communication according to claim 8,
- wherein each of the plurality of radiators is rotated +90 degrees or −90 degrees compared to adjacent radiators.

11. The short-range communication antenna for multi-link communication according to claim 10,
- wherein the first parasitic element and the second parasitic element have an oval shape.

12. The short-range communication antenna for multi-link communication according to claim 11,
- wherein the patch-shaped radiating element has a feeding point formed at a point other than the center of the radiating element.

13. The short-range communication antenna for multi-link communication according to claim 12,
- wherein each of the plurality of first decoupling elements and the plurality of second decoupling elements is arranged at an interval of $\lambda/2$.

14. The short-range communication antenna for multi-link communication according to claim 13,
- wherein the radiating element and the first parasitic element are formed on a first substrate, the second parasitic element, the first decoupling elements and the second decoupling elements are formed on a second substrate located on top of the first substrate, and a ground plane is formed on the lower part of the first substrate.

* * * * *